(12) United States Patent
Aguirre et al.

(10) Patent No.: US 8,767,576 B2
(45) Date of Patent: Jul. 1, 2014

(54) ACCESSING AN APPLICATION BASED ON A LEVEL OF SERVICE QUALITY

(75) Inventors: Sergio Aguirre, Southlake, TX (US); Derek Hongwei H. Bao, Concord, CA (US); Lalit R. Kotecha, San Ramon, CA (US); David Chiang, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 252 days.

(21) Appl. No.: 13/211,894

(22) Filed: Aug. 17, 2011

(65) Prior Publication Data
US 2013/0044614 A1 Feb. 21, 2013

(51) Int. Cl.
*H04W 24/00* (2009.01)

(52) U.S. Cl.
USPC .......................................... 370/252

(58) Field of Classification Search
USPC .................................. 370/241, 252
See application file for complete search history.

(56) References Cited

U.S. PATENT DOCUMENTS

| | | | | |
|---|---|---|---|---|
| 5,093,924 A * | 3/1992 | Toshiyuki et al. | | 455/450 |
| 5,454,026 A * | 9/1995 | Tanaka | | 455/437 |
| 5,974,310 A * | 10/1999 | Bilgic | | 455/418 |
| 6,091,954 A * | 7/2000 | Haartsen et al. | | 455/447 |
| 6,542,742 B2 * | 4/2003 | Schramm et al. | | 455/436 |
| 6,600,903 B1 * | 7/2003 | Lilja et al. | | 455/67.11 |
| 6,728,217 B1 * | 4/2004 | Amirijoo et al. | | 370/252 |
| 6,791,968 B2 * | 9/2004 | Kotzin | | 370/348 |
| 6,801,519 B1 * | 10/2004 | Mangal | | 370/349 |
| 6,961,573 B1 * | 11/2005 | Moon et al. | | 455/445 |
| 7,006,828 B1 * | 2/2006 | Czaja et al. | | 455/442 |
| 7,035,630 B2 * | 4/2006 | Knowles | | 455/419 |
| 7,245,922 B2 * | 7/2007 | Furuskar et al. | | 455/453 |
| 7,359,710 B2 * | 4/2008 | Benco et al. | | 455/452.2 |
| 7,587,219 B2 * | 9/2009 | Bottomley et al. | | 455/522 |
| 7,684,358 B2 * | 3/2010 | Kim et al. | | 370/312 |
| 7,746,782 B2 * | 6/2010 | Zaniolo et al. | | 370/235 |
| 7,768,967 B1 * | 8/2010 | Mangal | | 370/329 |
| 7,933,205 B1 * | 4/2011 | Shaw et al. | | 370/235 |
| 8,224,289 B2 * | 7/2012 | Poltorak | | 455/405 |
| 8,300,598 B2 * | 10/2012 | Kim et al. | | 370/331 |
| 8,320,382 B2 * | 11/2012 | Suwa et al. | | 370/395.21 |
| 8,340,678 B1 * | 12/2012 | Pandey | | 455/452.2 |
| 8,346,258 B2 * | 1/2013 | Kitaji | | 455/436 |
| 2002/0039892 A1 * | 4/2002 | Lindell | | 455/151.1 |
| 2005/0220034 A1 * | 10/2005 | Zaniolo et al. | | 370/252 |
| 2006/0111111 A1 * | 5/2006 | Ovadia | | 455/439 |
| 2006/0217116 A1 * | 9/2006 | Cassett et al. | | 455/423 |
| 2007/0253411 A1 * | 11/2007 | Arad et al. | | 370/389 |
| 2008/0008140 A1 * | 1/2008 | Forssell | | 370/338 |
| 2008/0112358 A1 * | 5/2008 | Bennett | | 370/329 |
| 2008/0123543 A1 * | 5/2008 | Do et al. | | 370/252 |

(Continued)

*Primary Examiner* — Chi Pham
*Assistant Examiner* — Robert Lopata

(57) ABSTRACT

A user device receives an instruction to access an application, of one or more applications being provisioned via one or more base stations; obtains service quality information, associated with the application, where the service quality information identifies one or more quality thresholds associated with one or more frequency bands to be used to access the application; measures a first level of service quality associated with traffic being received via a first frequency band and a second level of service quality associated with traffic being received via a second frequency band; and accesses the application using one of the first frequency band or the second frequency band based on a determination that another one of the first level of service quality or the second level of service quality is less than a threshold, of the one or more quality thresholds.

25 Claims, 7 Drawing Sheets

(56) References Cited

U.S. PATENT DOCUMENTS

| | | | |
|---|---|---|---|
| 2010/0015986 A1* | 1/2010 | Kono | 455/450 |
| 2010/0150011 A1* | 6/2010 | Kitaji | 370/252 |
| 2010/0159932 A1* | 6/2010 | Park et al. | 455/436 |
| 2010/0214955 A1* | 8/2010 | Rune et al. | 370/254 |
| 2011/0111729 A1* | 5/2011 | Poltorak et al. | 455/406 |
| 2011/0116467 A1* | 5/2011 | Jung et al. | 370/329 |
| 2011/0222403 A1* | 9/2011 | Suh et al. | 370/231 |
| 2011/0256870 A1* | 10/2011 | Park et al. | 455/436 |
| 2012/0131138 A1* | 5/2012 | Swenson et al. | 709/217 |
| 2013/0072214 A1* | 3/2013 | Quan et al. | 455/452.2 |
| 2013/0157585 A1* | 6/2013 | Naruszewicz et al. | 455/73 |
| 2013/0183995 A1* | 7/2013 | Smith et al. | 455/452.2 |

* cited by examiner

| SERVICE ID 405 | SERVICE TYPE 410 | FREQUENCY BAND 415 | BASE STATION ID 420 | COVERAGE 425 | SERVICE INFO 430 |
|---|---|---|---|---|---|
| APP1 | MT | BAND 1 | 120-1 | AREA1 | SQ1-L<br>SQ1-M<br>SQ1-H |
| APP1 | MT | BAND 2 | 120-2 | AREA2 | SQ2-L<br>SQ2-M<br>SQ2-H |
| APP1 | UT | BAND 1 | 120-3 | AREA3 | SQ3-L<br>SQ3-M<br>SQ3-H |
| ... | | ... | | | |

FIG. 4

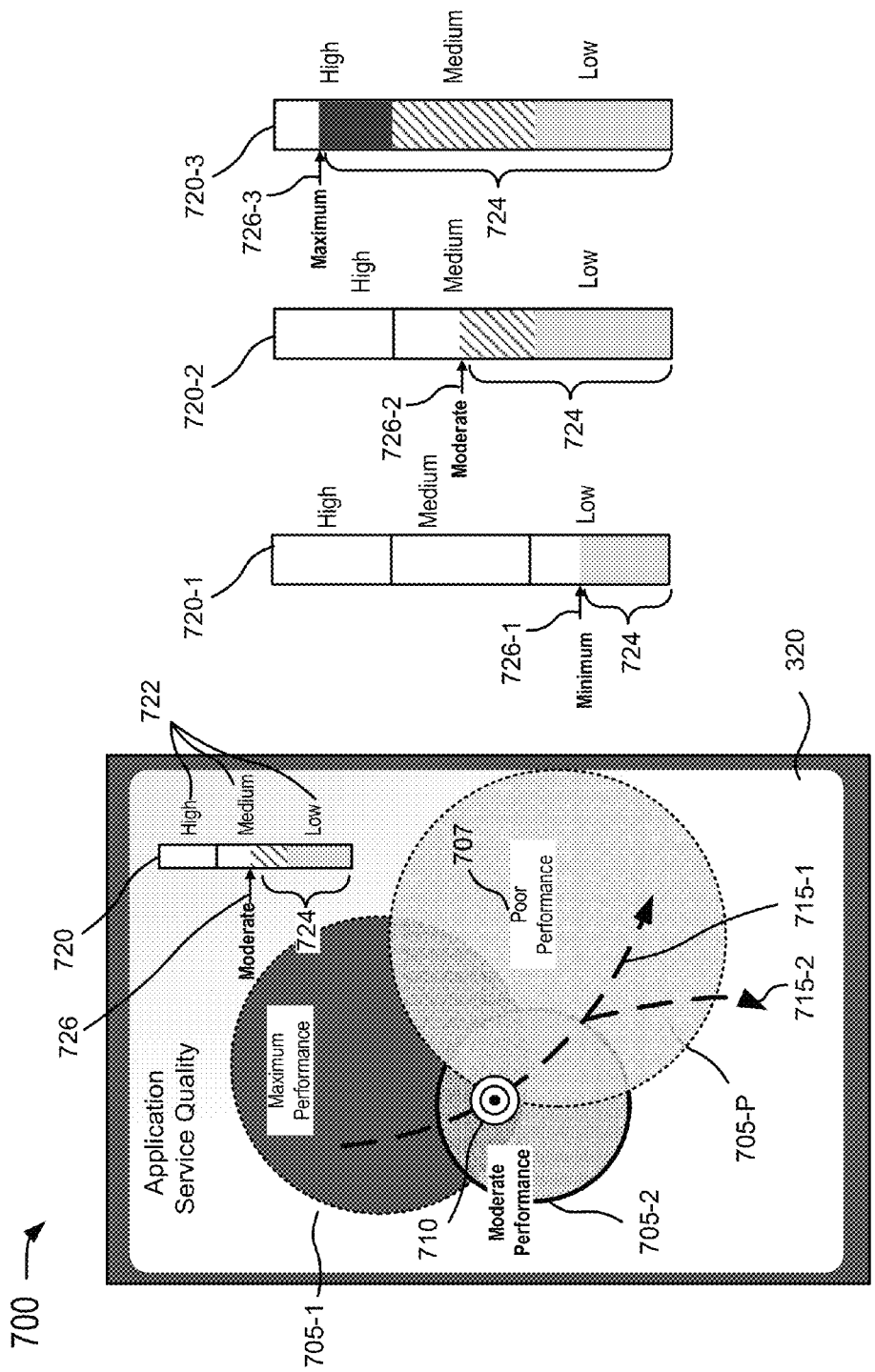

ACCESSING AN APPLICATION BASED ON A LEVEL OF SERVICE QUALITY

BACKGROUND

A user device may communicate with a network via a base station that processes traffic traveling between the user device and the network. The user device may communicate with the network while moving between cells associated with different base stations. User devices may communicate with the base stations to receive services, from the network, via unicast, multicast, and/or broadcast communications. The unicast, multicast, and/or broadcast communications may be received on different frequencies and/or channels. However, the user device may select a channel, via which to access the services, associated with a level of service quality that is less than a threshold. The level of service quality, that is less than the threshold, may render the services unusable by a user of the user device and/or result in a poor user experience for the user.

BRIEF DESCRIPTION OF THE DRAWINGS

FIG. 4 is a diagram of an example data structure that stores service quality information associated with an application and/or service;

FIGS. 7A and 7B are diagrams of service level indicators capable of being displayed via a user interface based on service quality information.

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable a network to identify service quality thresholds that correspond to levels of service quality (e.g., high, medium, low, etc.) associated with an application and/or service to be accessed by a user device. Levels of service quality may correspond to measures of availability of an application being accessed by the user device, quantities of bandwidth used to access the application, quantity and/or severity of conditions (e.g., jitter, dropped packets, mis-ordered packets, etc.) associated with accessing the application, quality of service (QoS) levels being received by a user device, etc.

The systems and/or methods may transmit the service quality thresholds to a user device that allows the user device to use the service quality thresholds to identify a level of service quality associated with an application being accessed by the user device. The systems and/or methods may allow the user device to measure a level of service quality, being received from the network. The systems and/or methods may enable the user device to render, for display, information associated with the measured level of service quality (e.g., such as a service quality indicator and/or meter) relative to the service quality thresholds.

The systems and/or methods may allow the user device to use the service quality thresholds and/or the measured levels of service quality and/or signal quality to select a manner in which an application and/or service is to be accessed. The systems and/or methods may, for example, allow the user device to select whether to access the application and/or service as unicast traffic or multicast traffic based on the service quality thresholds and/or the measured levels of service quality and/or signal quality. The systems and/or methods may, in another example, allow the user device to select via which frequency band to access the application and/or service based on the service quality thresholds and/or the measured levels of service quality and/or signal quality.

Figure 1:
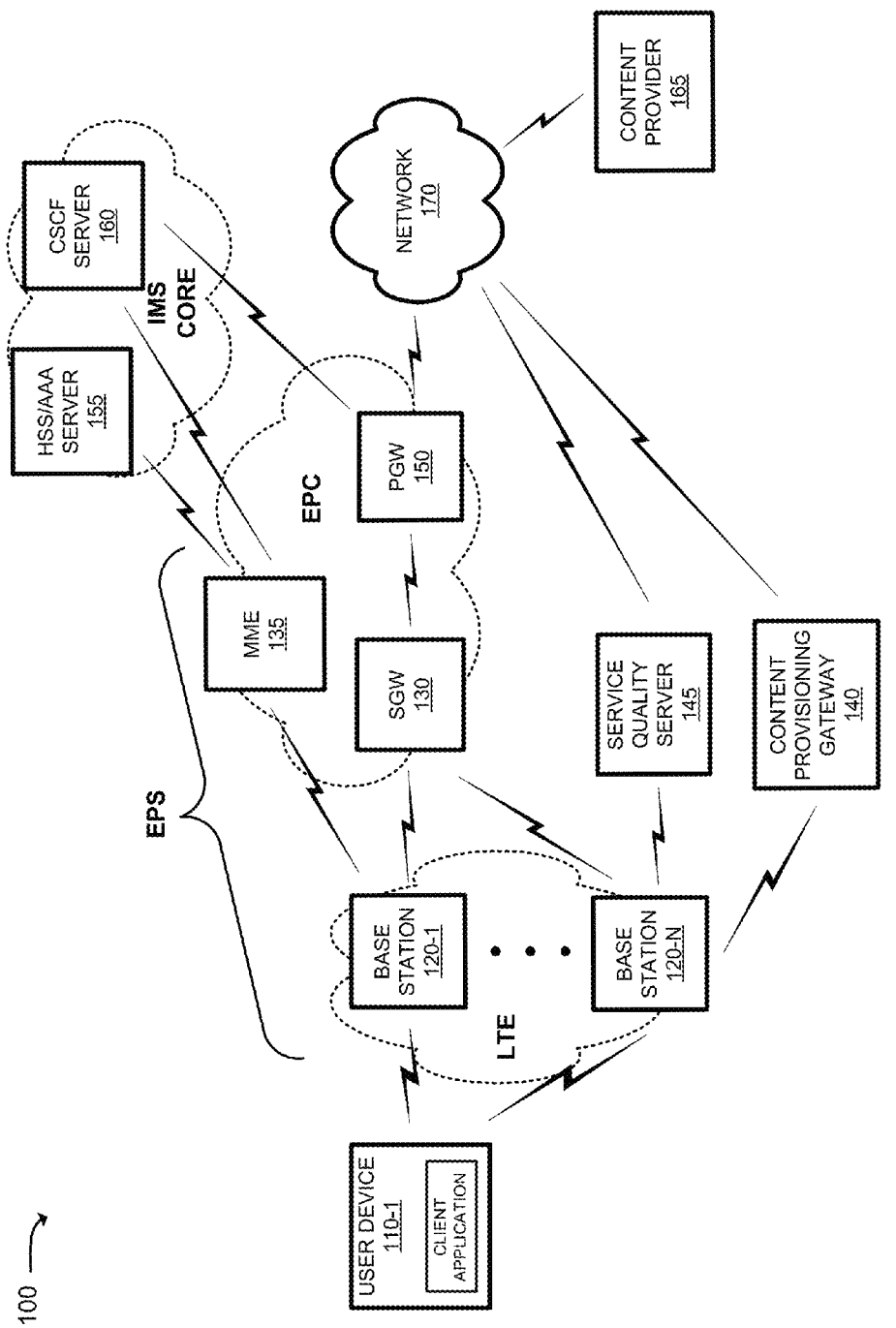
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a user device 110, a group of base stations 120-1, . . . , 120-N (where N≥1) (hereinafter referred to collectively as "base stations 120" and individually as "base station 120"), a serving gateway 130 (hereinafter referred to as "SGW 130"), a mobility management entity device 135 (hereinafter referred to as "MME 135"), a content provisioning gateway 140 (hereinafter referred to as "content gateway 140"), a service quality server 145, a packet data network (PDN) gateway (PGW) 150, a home subscriber server (HSS)/authentication, authorization, accounting (AAA) server 155 (hereinafter referred to as an "HSS/AAA server 155"), a call session control function (CSCF) server 160 (hereinafter referred to as "CSCF server 160"), a content provider 165, and a network 170. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Implementations are described as being performed within a RAN that is based on a long term evolution (LTE) network for explanatory purposes. In other implementations, the implementations may be performed within a RAN that is not based on a LTE network.

Environment 100 may include an evolved packet system (EPS) that includes a LTE network and/or an evolved packet core (EPC) that operate based on a third generation partnership project (3GPP) wireless communication standard. The LTE network may be a RAN that includes one or more base stations 120 that take the form of evolved Node Bs (eNBs) via which user devices 110 communicate with the EPC. The EPC may include SGW 130, MME 135, and/or PGW 150 that enable user devices 110 to communicate with network 170 and/or an Internet protocol (IP) multimedia subsystem (IMS) core. The IMS core may include HSS/AAA server 155 and/or CSCF server 160 and may manage authentication, session initiation, account information, profile information, etc. associated with user devices 110.

User device 110 may include any computation or communication device, such as a wireless mobile communication device that is capable of communicating with base station 120 and/or a network (e.g., network 170). For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. User device 110 may send traffic to and/or receive traffic from network 170.

User device 110 may receive service quality information from service quality server 145 via base station 120. The service quality information may identify service quality thresholds that correspond to levels of service quality associated with accessing an application and/or service. The service quality thresholds for one application may differ from service quality thresholds associated with another application. For example, a high-bandwidth application, such as, for example, a video game (e.g., that uses a quantity of band that is greater than a threshold), may include service quality thresholds that are different than other service quality thresholds associated with an application that his not a high-bandwidth application, such as an instant messaging application. In another example implementation, the service quality information may be stored in a memory, associated with user device 110, when user device 110 is being fabricated. In yet another example implementation, the service quality information may be stored, in the memory, when user device 110 is registered (e.g., with HSS/AAA server 155 and/or the IMS core). User device 110 may erase or over-write previous service quality information that was stored in the memory at a prior time relative to a current time (e.g., when user device 110 was being fabricated and/or registered with a network.

A service quality threshold, associated with an application may, for example, identify a first quantity of bandwidth (e.g., associated with a high service quality threshold) that corresponds to maximum performance of the application. The maximum performance may correspond to the application being fully available to a user of user device 110, such that the user does not perceive latency when using the application (e.g., such as when waiting for the application to process information, download information, etc.) and/or when all features, associated with the application are operating.

Another service quality threshold, associated with the application, may, for example, identify a second quantity of bandwidth (e.g., associated with a medium service quality threshold) that corresponds to moderate performance with respect to the application. The moderate performance may correspond to the application being available to the user, such that the user perceives some latency (e.g., for a period of time that is less than a latency threshold) and/or reduction in functionality (e.g., when a quantity of features, associated with the application are not operating) when using the application.

Yet another service quality threshold, associated with the high-bandwidth application, may, for example, identify a third quantity of bandwidth (e.g., associated with a low service quality threshold) that corresponds to minimum performance with respect to the application. The minimum performance may correspond to the application being minimally available to the user, such that the user perceives significant latency (e.g., for another period of time that is not less than the latency threshold) and/or a further reduction in functionality (e.g., when a minimum quantity of features is operating) when using the application. Bandwidth used, by user device 110, to access and/or use the application that is below the low threshold may render the application unavailable and/or unable to be used by the user of user device 110. Other service quality thresholds, associated with an application, may be included within the service quality information, such as one or more thresholds associated with different data rates, quantities of dropped packets and/or mis-ordered packets, quantities and/or severity levels of jitter, etc.

User device 110 may measure levels of service quality being received from base station 120. The level of signal quality may correspond to a quantity of bandwidth associated with a frequency band, a quantity of dropped packets, a quantity of mis-ordered packets, detection of jitter, etc. The level of service quality may also correspond to a measure of availability of the application and/or service. The measure of availability may correspond to a period of time when the application is available to be used by a user of user device 110 relative to another period of time associated with a communication session to access the application and/or service.

User device 110 may use the service quality information and/or the measured levels of service quality to select via which frequency band and/or content delivery mode (e.g., via unicast, multicast, broadcast, etc.) to access the application and/or service. User device 110 may also, or alternatively, use the service quality information and/or the measured levels of service quality to render, for display, information associated with the measured level of service quality (e.g., such as a service quality indicator and/or meter) relative to the service quality thresholds.

Base station 120 may include one or more devices that receive, process, and/or transmit traffic, such as audio, video, text, and/or other data, destined for and/or received from user device 110. In an example implementation, base station 120 may be an eNB associated with the LTE network that receives traffic from and/or sends traffic to network 170 via SGW 130 and PGW 150. Base station 120 may send traffic to and/or receive traffic from user device 110 via an air interface. In another example, one or more other base stations 120 may be associated with a RAN that is not associated with the LTE network.

Base station 120 may transmit information associated with traffic load conditions (e.g., hereinafter referred to as "traffic load information") to content gateway 140. Traffic load information may identify a quantity of bandwidth being processed by base station 120, a respective quantity of bandwidth associated with each application and/or service being provisioned by base station 120, a type of traffic being provisioned (e.g., unicast, multicast, video, voice, text, etc.) via base station 120, user devices 110 being served by base station 120, etc.

SGW 130 may include one or more computation or communication devices that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 130 may aggregate traffic received from one or more base stations 120 associated with the LTE network, and may send the aggregated traffic to network 170 (e.g., via PGW 150) and/or other network devices associated with the IMS core and/or the EPC. SGW 130 may also receive traffic from the other network devices and/or may send the received traffic to user device 110 via base station 120. SGW 130 may perform operations associated with handing off user device 110 from and/or to the LTE network.

MME 135 may include one or more computation or communication devices that gather, process, search, store, and/or provide information in a manner described herein. For example, MME 135 may perform operations associated with handing off user device 110, from a first base station 120 to a second base station 120, when user device 110 is exiting a cell associated with the first base station 120. MME 135 may, in yet another example, perform an operation to handoff user device 110 from the second base station 120 to the first base station 120 when user device 110 is entering the cell associated with first base station 120.

Content gateway 140 may include one or more gateway devices, or other types of computation or communication devices, that gather, process, search, store, and/or provide information in a manner described herein. In an example implementation, content gateway 140 may process unicast and/or multicast traffic to be distributed to one or more user devices 110. For example, content gateway 140 may receive traffic (e.g., streaming video and/or audio, progressive video and/or audio, etc.) from content provider 165. Content gateway 140 may transmit the traffic to user device 110 via network 170, the EPC and/or the LTE. Content gateway 140 may buffer the traffic to ensure that the traffic is transmitted at a bandwidth and/or data rate that conforms to a policy associated with network 170, that abides by a service level agreement (SLA) with user device 110, and/or that can be processed by user device 110.

Content gateway 140 may transmit the traffic as unicast traffic or multicast traffic. For example, content gateway 140 may transmit unicast traffic that is destined for user device 110. In another example, content gateway 140 may transmit the traffic as multicast traffic that is destined for a group of user devices 110 (e.g., associated with a multicast group membership). When transmitting the multicast traffic, content gateway 140 may transmit a multicast stream to base station 120 for distribution to one or more user devices 110 identified by the multicast stream. In another example, content gateway 140 may transmit a copy of the multicast stream to another base station 120 for distribution to another one or more user devices 110 identified by the copy of the multicast stream.

Content gateway 140 may communicate with base stations 120 to obtain traffic load information associated with each base station 120. Content gateway 140 may use the traffic load information to allocate RAN resources among each of base stations 120 and/or among frequency bands that are supported by third generation (3G) and/or fourth generation (4G) technologies that are based on the 3GPP standard. The frequency bands may include, for example, a PCS band, an advanced wireless services (AWS) band, a lower 700 megahertz (MHz) band, an upper 700 MHz band, a cellular band, and/or some other band (e.g., as specified by a 3GPP standard, etc.). For example, content gateway 140 may allocate a first frequency band and/or channel to an application and/or service (e.g., voice-over-IP (VoIP) traffic, voice traffic, etc.). In another example, content gateway 140 may allocate a second frequency band and/or channel to another application and/or service (e.g., Internet traffic, email traffic, etc.). In yet another example, content gateway 140 may allocate a third frequency band and/or channel to a further application and/or service to be transmitted as multicast traffic (e.g., using an evolved multimedia broadcast multicast service (eMBMS) protocol that can be implemented by the LTE network based on 4G technologies).

Service quality server 145 may include one or more server devices, or other types of computation or communication devices, that gather, process, search, store, and/or provide information in a manner described herein. Service quality server 145 may communicate with content gateway 140 to obtain traffic information to identify applications and/or services being provisioned, to user devices 110, via base stations 120. Service quality server 145 may receive service quality thresholds for each of the applications being provisioned by base station 120. In one example, the service quality thresholds may be received from an operator of service quality server 145. In another example, service quality server 145 may communicate with content provider 165 to obtain the service quality thresholds.

Service quality server 145 may generate service quality information, for each application, based on the identified service quality thresholds and/or the traffic load information. Service quality server 145 may transmit, to user devices 110, the service quality information. In one example, service quality server 145 may transmit the service quality information, to user devices 110, using a customer-premises equipment (CPE) wide area network (WAN) Management Protocol (CWMP) (e.g., based on Broadband Forum's Technical Report 069 (TR-69)). Transmitting the service quality information, using CWMP, may allow user devices 110 to receive, store, update, and/or use the service quality information when accessing an application and/or service via base station 120.

PGW 150 may include one or more computation or communication devices that gather, process, search, store, and/or provide information in a manner described herein. PGW 140 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 150 may include a device that aggregates traffic received from one or more SGWs 130, etc. and may send the aggregated traffic to network 170. In another example implementation, PGW 150 may receive traffic from network 170 and may send the traffic toward user device 110 via SGW 130.

HSS/AAA server 155 may include one or more server devices, or other types of computation or communication devices, that gather, process, search, store, and/or provide information in a manner described herein. For example, HSS/AAA server 155 may manage, update, and/or store, in a memory associated with HSS/AAA server 155, profile information associated with user device 110 that identifies applications and/or services that are permitted for and/or accessible by user device 110, information associated with a user of user device 110 (e.g., a username, a password, a personal identification number (PIN), etc.), rate information, minutes allowed, and/or other information. Additionally, or alternatively, HSS/AAA server 155 may include a device that performs authentication, authorization, and/or accounting (AAA) operations associated with a communication session with user device 110.

CSCF server 160 may include one or more server devices, or other types of computation or communication devices, that gather, process, search, store, and/or provide information in a manner described herein. CSCF server 160 may process and/or route calls to and from user device 110 via the EPC. For example, CSCF server 160 may process calls, received from network 170, that are destined for user device 110. In another example, CSCF server 160 may process calls, received from user device 110, that are destined for network 170.

Content provider 165 may include any type or form of content provider. For example, content provider 165 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., YouTube, Vimeo, Netflix, Hulu, Veoh, etc.) that stream content from web sites and/or permit content to be downloaded (e.g., via progressive download, etc.). Content provider 165 may include on-demand content providers (e.g., video on demand (VOD) providers, pay per view (PPV) providers, etc.). A media stream, as used herein, may refer to a stream of content that includes video content (e.g., a video stream), audio content (e.g., an audio stream), and/or textual content (e.g., a textual stream).

Network 170 may include one or more wired and/or wireless networks. For example, network 170 may include a cellular network, a public land mobile network (PLMN), a second generation (2G) network, a 3G network, a 4G network, a fifth generation (5G) network, and/or another network. Additionally, or alternatively, network 170 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

Figure 2:
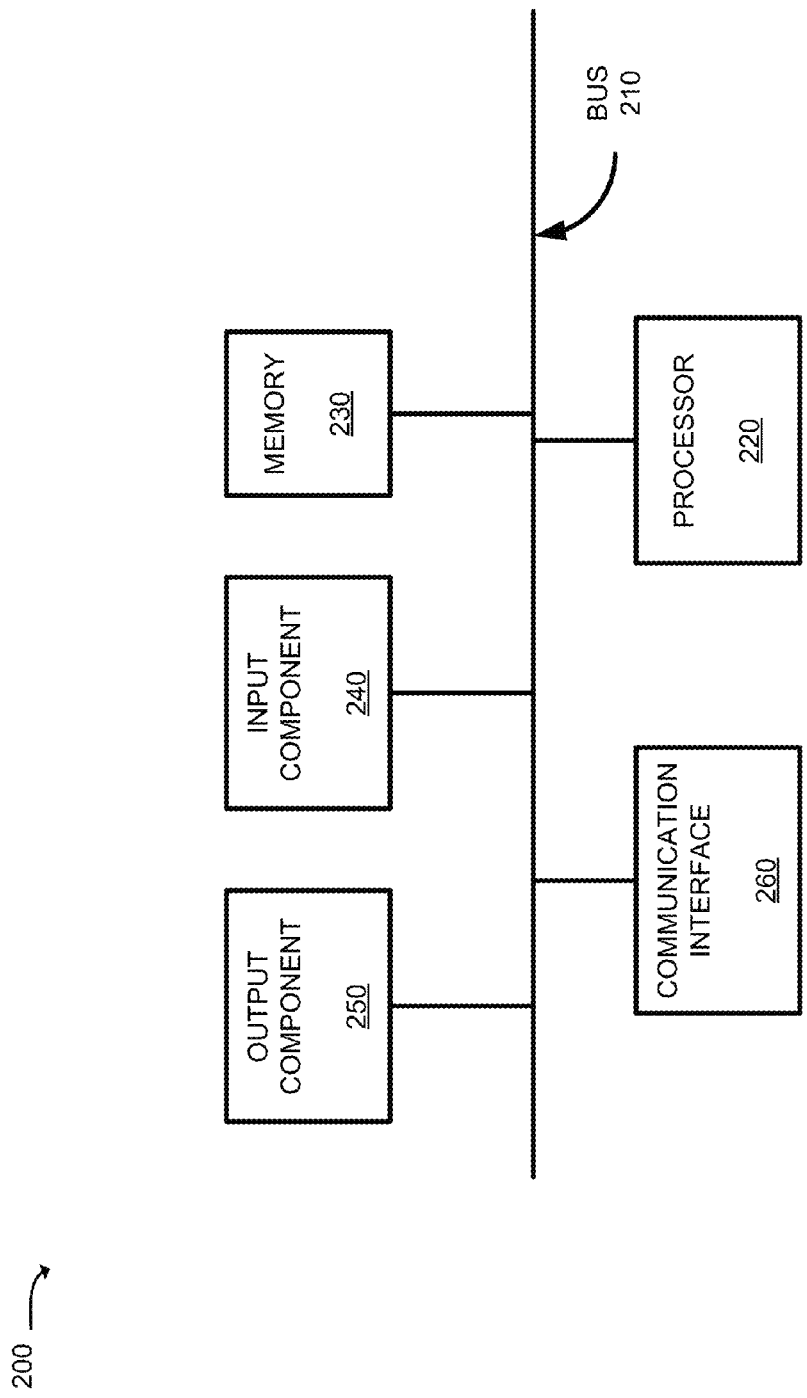
FIG. 2 is a diagram of example components of one or more devices of FIG. 1.

FIG. 2 is a diagram of example components of a device 200. Device 200 may correspond to user device 110, SGW 130, MME 135, content gateway 140, service quality server 145, PGW 150, HSS/AAA server 155, CSCF server 160, and/or content provider 165. Alternatively, or additionally, each of user device 110, SGW 130, MME 135, content gateway 140, service quality server 145, PGW 150, HSS/AAA server 155, CSCF server 160, and/or content provider 165 may include one or more devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 170. In one alternative implementation, communication interface 260 may be a logical component that includes input and output ports, input and output systems, and/or other input and output components that facilitate the transmission of data to other devices.

As described herein, device 200 may perform certain operations relating to content delivery based on service level thresholds. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
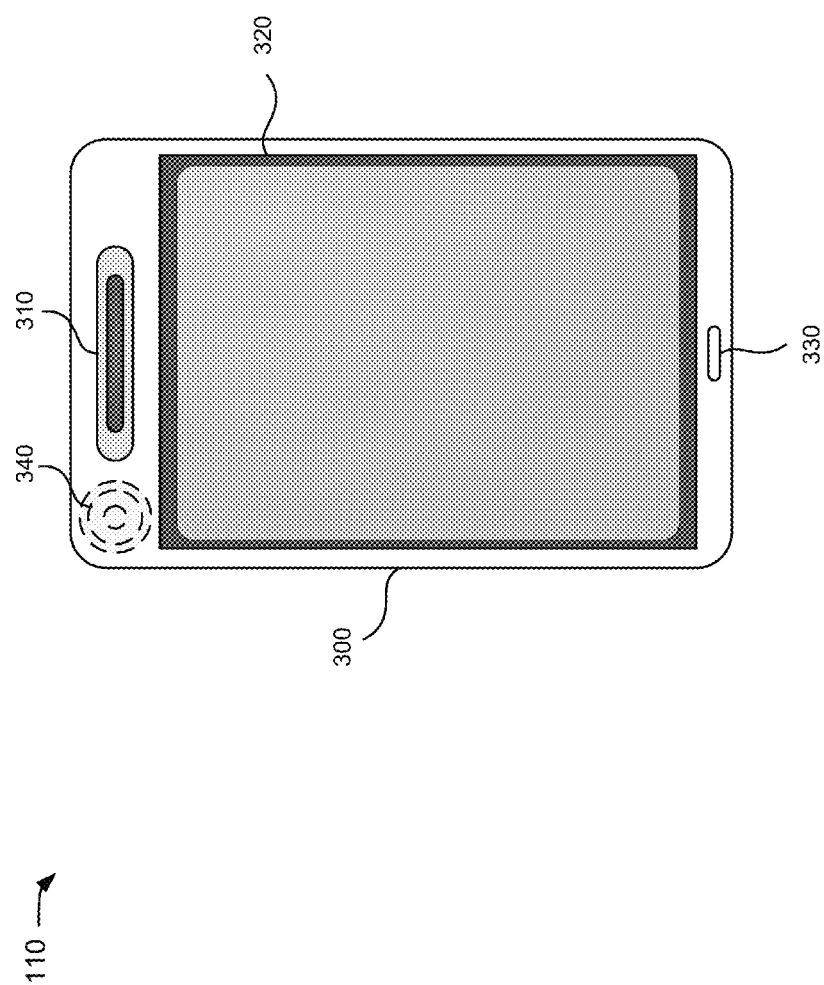
FIG. 3 is a diagram of an example user device of FIG. 1.

FIG. 3 is a diagram of an example user device 110. As shown in FIG. 3, user device 110 may include a housing 300, a speaker 310, a display 320, a microphone 330, and/or a camera 340. Housing 300 may include a chassis via which some or all of the components of user device 110 are mechanically secured and/or covered. Speaker 310 may include a component to receive input electrical signals from user device 110 and transmit audio output signals, which communicate audible information to a user of user device 110.

Display 320 may include a component to receive input electrical signals and present a visual output in the form of text, images, videos and/or combinations of text, images, and/or videos which communicate visual information to the user of user device 110. In one implementation, display 320 may display text input into user device 110, text, images, and/or video received from another device, and/or information regarding incoming or outgoing calls or text messages, emails, media, games, phone books, address books, the current time, etc.

Display 320 may be a touch screen that presents one or more images that corresponds to control buttons. The one or more images may accept, as input, mechanical pressure from the user (e.g., when the user presses or touches an image corresponding to a control button or combinations of control buttons) and display 320 may send electrical signals to processor 220 that may cause user device 110 to perform one or more operations. For example, the control buttons may be used to cause user device 110 to transmit information. Display 320 may present one or more other images associated with a keypad that, in one example, corresponds to a standard telephone keypad or another arrangement of keys.

Microphone 330 may include a component to receive audible information from the user and send, as output, an electrical signal that may be stored by user device 110, transmitted to another user device, or cause the device to perform one or more operations. Camera 340 may be provided on a front or back side of user device 110, and may include a component to receive, as input, analog optical signals and send, as output, a digital image or video that can be, for example, viewed on display 320, stored in the memory of user device 110, discarded and/or transmitted to another user device 110.

Although FIG. 3 depicts example components of user device 110, in other implementations, user device 110 may include fewer components, additional components, different components, or differently arranged components than illustrated in FIG. 3. For example, user device 110 may include a keyboard, a keypad, and/or other input components. In still other implementations, one or more components of user device 110 may perform one or more tasks described as being performed by one or more other components of user device 110.

FIG. 4 is a diagram of an example data structure 400 that stores service quality information associated with an application and/or service. Data structure 400 may be stored in a memory and/or storage device associated with service quality server 145 and/or user device 110. Data structure 400 may include a collection of fields, such as a service identifier (ID) field 405, a service type field 410, a frequency band field 415, a base station ID field 420, a coverage field 425, and a service info field 430. Data structure 400 includes fields 405-430 for explanatory purposes. In practice, data structure 400 may include additional fields, fewer fields, different fields, and/or differently arranged fields than are described with respect to flow data structure 400.

Service ID field 405 may store information that identifies a particular application and/or service that is being provisioned by base station 120. For example, the information that identifies the particular application and/or service may include an application and/or service identifier (e.g., an application name, etc.), an access point name (APN) associated with the particular application and/or service, information that identifies a flow (e.g., a flow identifier) associated with the particular application and/or service, etc. Service type field 410 may store information that identifies a type of traffic associated with the particular application and/or service. For example, service type field 410 may store information that identifies whether the type of traffic is unicast, multicast, and/or broadcast traffic. In another example, service type field 410 may store information that identifies whether the traffic is associated with streaming video, streaming audio, messaging traffic (e.g., instant messaging, email, etc.), Internet traffic (e.g., based on browsing, etc.) and/or other types of traffic.

Frequency band field 415 may store information that identifies a frequency band and/or a channel, associated with the frequency band, via which the particular application and/or service can be accessed by user device 110. For example, frequency band field 415 may store information that identifies one or more channels, associated with a particular frequency band, such as, for example, a PCS band (e.g., 1.85-1.99 gigahertz (GHz)), an AWS band (e.g., 1.71 to 1.755 GHz), a lower 700 MHz band, an upper 700 MHz band, a cellular band (e.g., 850 MHz) and/or some other band (e.g., as identified by a 3GPP standard, etc.). Base station ID field 420 may store information that identifies via which base station 120 the particular application and/or service can be obtained. The identified base station 120 may provision the particular application and/or service, to user device 110, at the frequency band and/or channel identified in frequency band field 415.

Coverage field 425 may store coverage information that identifies an area to which a level of service quality (e.g., high, medium, low, and/or some other level of service quality) and/or level of application performance (e.g., maximum, moderate, minimum, and/or some other performance level), associated with the particular application and/or service, corresponds. For example, the coverage information may identify one or more cells that are associated with a low level of service quality and/or a minimum level of application performance. In another example, the coverage information may identify one or more cells that are associated with a medium level of service quality and/or a moderate level of application performance. In yet another example, the coverage information may identify one or more cells that are associated with a high level of service quality and/or a maximum level of application performance.

Service info field 430 may store information that identifies service quality thresholds associated with the particular application and/or service. The service quality levels may, for example, correspond to different quantities of bandwidth, data rates, quantities and/or severity levels of jitter, quantities of dropped and/or mis-ordered packets, etc. that are received, by user device 110, when accessing the particular application and/or service. The service quality levels (e.g., high, medium, low, and/or some other service quality level) may correspond to different levels of performance (e.g., maximum, medium, minimum, and/or some other level of performance) by the particular application and/or service, when being accessed by user device 110.

Service quality server 145 may generate service quality information based on traffic load information obtained from content gateway 140 and/or service quality thresholds, obtained from content provider 165, for an application identified from the traffic load information. Service quality server 145 may store the service quality information in data structure 400. For example, service quality server 145 may store, within data structure 400, information associated with an application (e.g., APP1) and/or an indication that the application can be accessed, using a first frequency band (e.g., band 1), as multicast traffic (e.g., MT) via base station 120 (e.g., 120-1) (e.g., as shown by ellipse 437). Service quality server 145 may store information that identifies a level of service quality (e.g., an average level, a median level, etc.), being received by user devices 110 within an area (e.g., that corresponds to cell coverage area associated with base station 120 or some other area) that is covered by cells associated with base station 120 (e.g., area1) (e.g., as shown by ellipse 437). Service quality server 145 may store values that correspond to the service quality thresholds (e.g., SQ1-L, SQ1-M, and SQ1-H), associated with the application, when accessed using the first band (e.g., as shown by ellipse 437).

In another example, service quality server may store another indication that the application can be accessed, using a second frequency band (e.g., band 2), as the multicast traffic (e.g., MT) via another base station 120 (e.g., 120-2) (e.g., as shown by ellipse 439). Service quality server 145 may store information that identifies a level of service quality, being received by other user devices 110, within another area (e.g., area 2) that is covered by cells associated with the other base station 120 (e.g., as shown by ellipse 439). Service quality server 145 may store values that correspond to other service quality thresholds (e.g., SQ2-L, SQ2-M, and SQ2-H), associated with the application, when accessed using the second band (e.g., as shown by ellipse 439).

In yet another example, service quality server 145 may store a further indication that the application can be accessed, using a third frequency band (e.g., band 3), as unicast traffic (e.g., UT) via a further base station 120 (e.g., 120-3) (e.g., as shown by ellipse 441). Service quality server 145 may store information that identifies a level of service quality, being received by further user devices 110, within a further area (e.g., area 3) that is covered by cells associated with the further base station 120 (e.g., as shown by ellipse 441). Service quality server 145 may store values that correspond to further service quality thresholds (e.g., SQ3-L, SQ3-M, and SQ3-H), associated with the application, when accessing the application using the third frequency band (e.g., as shown by ellipse 441).

Figure 5:
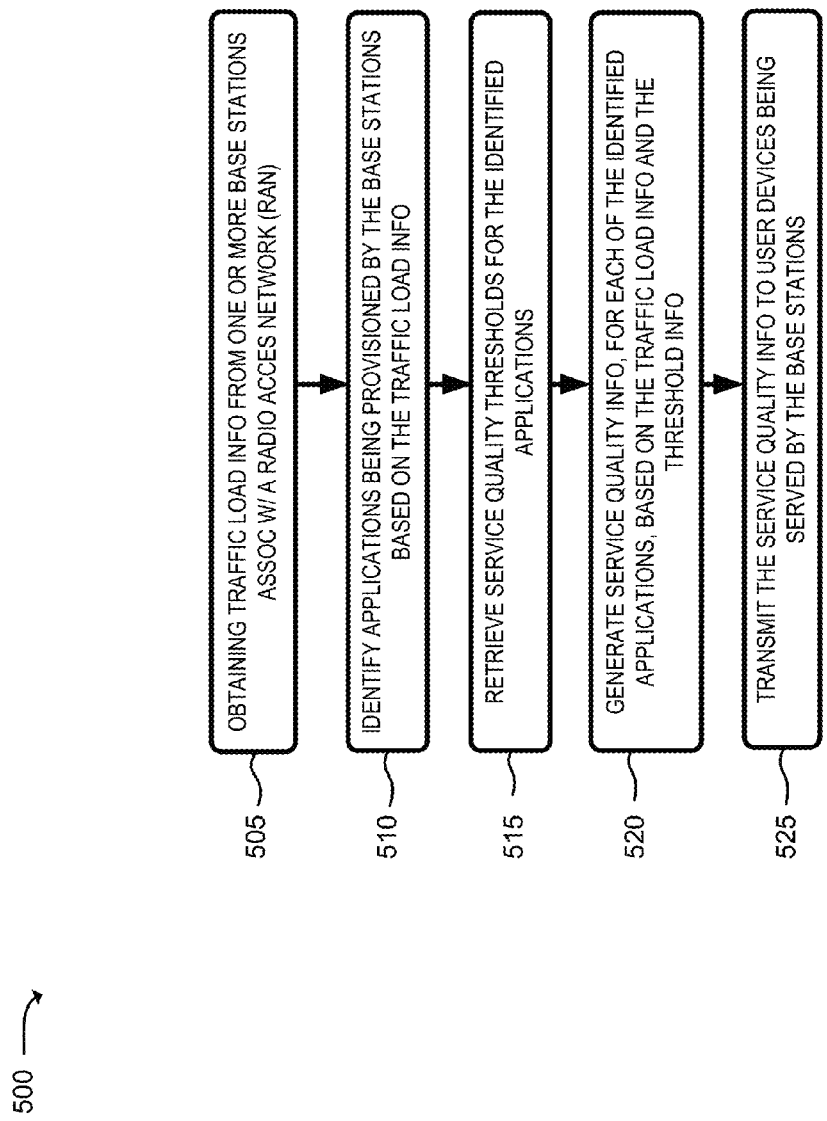
FIG. 5 is a flow chart of an example process for generating and/or provisioning service quality information, according to an implementation described herein.

FIG. 5 is a flow chart of an example process 500 for generating and/or provisioning service quality information, according to an implementation described herein. In one example implementation, process 500 may be performed by service quality server 145. In another example implementation, some or all of process 500 may be performed by a device or collection of devices separate from, or in combination with service quality server 145.

As shown in FIG. 5, process 500 may include obtaining traffic load information from one or more base stations associated with a radio access network (RAN) (block 505). For example, service quality server 145 may transmit, to content gateway 140, a request for traffic load information associated with base stations 120 associated with a RAN. Service quality server 145 may, for example, determine that traffic load information is to be obtained based on a predetermined time (e.g., based on a particular time of the day, etc.), a time interval (e.g., every five minutes, thirty minutes, one hour, two hours, six hours, etc.), as a result of an occurrence of some event (e.g., in response to a request received from user device 110, etc.), etc.

Content gateway 140 may receive the request and may, in response to the request, transmit an instruction, to base stations 120, to obtain traffic load information from base stations 120 associated with a RAN. Base stations 120 may receive the instruction and may transmit, to content gateway 140, the traffic load information. The traffic load information, obtained from base station 120, may identify a quantity of bandwidth being processed by base station 120, a quantity of bandwidth that is available with respect to each carrier frequency, channel, etc., and/or which applications and/or services are being provisioned via base station 120. The traffic load information may also identify a type of traffic being provisioned (e.g., unicast, multicast, broadcast, video, voice, text, etc.) via base station 120, which user devices 110 are being served by base station 120, a level of service quality being received by user devices 110, etc. The level of service quality may be based on a respective level of service quality being received, by each user device 110, via base station 120. In another example implementation, service control gateway 145 may communicate with base station 120 and/or user devices 110 to obtain the control information.

As also shown in FIG. 5, process 500 may include identifying applications that are being provisioned by base stations 120 based on the traffic load information (block 510) and retrieving service quality thresholds for the identified applications (block 515). For example, service quality server 145 may identify, from the traffic load information, one or more applications and/or services being provisioned by base stations 120. Service quality server 145 may communicate with content server 165 to obtain service quality thresholds associated with the one or more identified applications. Service quality server 145 may store the service quality thresholds in a memory associated with service quality server 145.

As further shown in FIG. 5, process 500 may include generating service quality information, for each of the identified applications, based on the traffic load information and/or the service quality thresholds (block 520). For example, service quality server 145 may generate service quality information, associated with an application that is being provisioned by one or more base stations 120. Service quality server 145 may, for example, obtain a respective portion of traffic load information, associated with an application, from traffic load information associated with base stations 120. Service quality server 145 may generate service quality information (e.g., such as service quality information stored in data structure 400 of FIG. 4), associated with the application, based on the portions of the traffic load information and/or service quality thresholds associated with the application and/or service.

As yet further shown in FIG. 5, process 500 may include transmitting the service quality information to user devices being served by the base stations (block 525). For example, service quality server 145 may transmit the service quality information, via base stations 120, to user device 110. Transmitting the service quality information, to user devices 110, may allow user devices 110 to use the service quality information to select a manner in which to select an application to access and/or to access a selected application (e.g., based on a frequency band, a level of service quality, base station 120, etc.) while maximizing a level of service quality associated with accessing the application and/or service. The service quality information may be automatically transmitted, to user devices 110, based on a time interval, a time of day, etc. In another example implementation, the service quality information may be transmitted, to user devices 110, in response to a request for the service quality information received from one or more user devices 110. In yet another example implementation, user devices 110 may obtain pre-determined service quality thresholds from a memory associated with user device 110.

Figure 6:
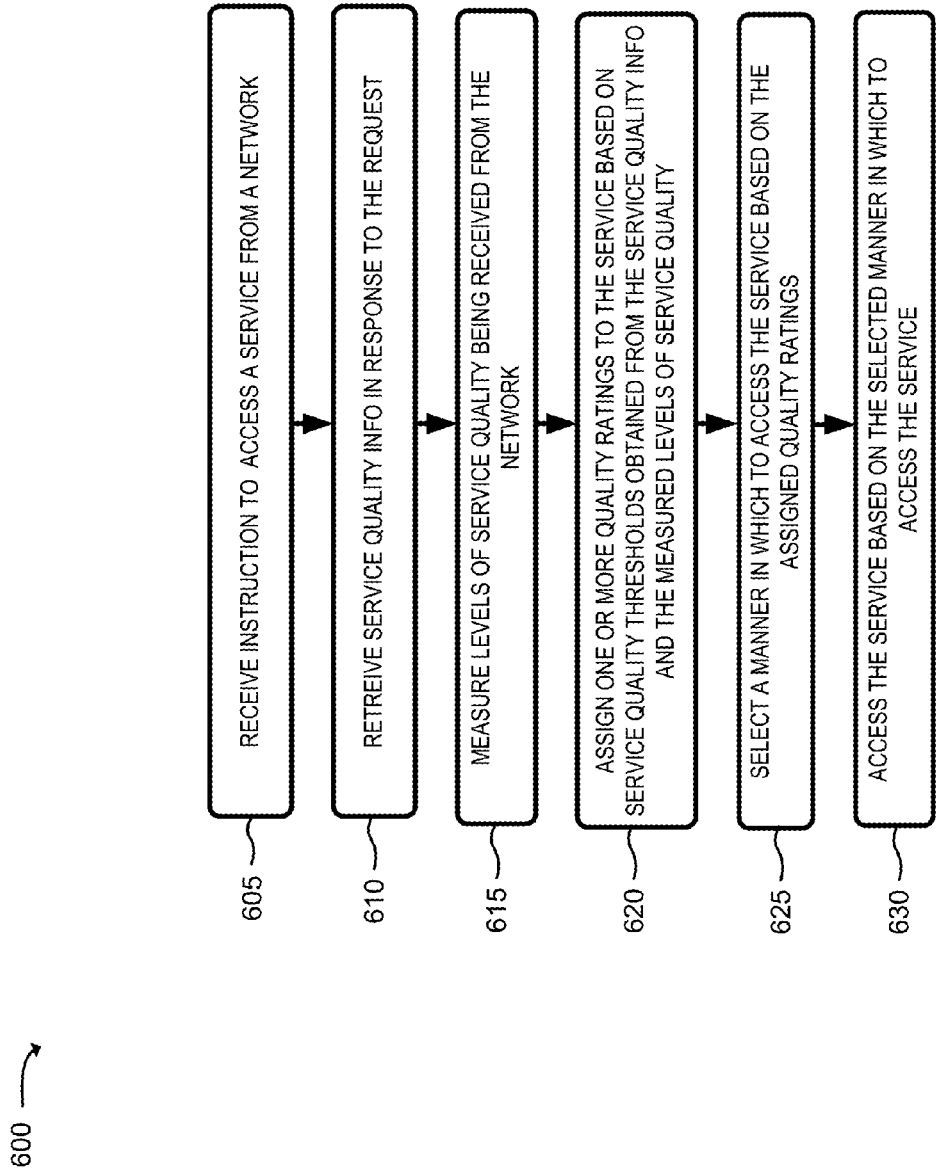
FIG. 6 is a flow chart of an example process for selecting a manner in which to access an application and/or service based on service quality information associated with the application and/or service, according to an implementation described herein.

FIG. 6 is a flow chart of an example process 600 for selecting a manner in which to access an application and/or service based on service quality information associated with the application and/or service, according to an implementation described herein. In one example implementation, process 600 may be performed by user device 110. In another example implementation, some or all of process 600 may be performed by a device or collection of devices separate from, or in combination with user device 110. FIGS. 7A and 7B are diagrams of service quality information being displayed, on user device 110, according to an implementation described herein. A portion of process 600 is described with references to the service quality information shown in FIGS. 7A and 7B.

As shown in FIG. 6, process 600 may include receiving an instruction to access a service from a network (block 605) and retrieving service quality information in response to the instruction (block 610). For example, a user, of user device 110, may desire to access an application and/or service from a network (e.g., network 170) and may instruct user device 110 to communicate, with the network, to access the application and/or service. User device 110 may receive the instruction and may retrieve, from a memory associated with user device 110, service quality information, associated with the application and/or service, that was previously downloaded, by user device 110 in a manner similar to that described above with respect to FIG. 5.

The service quality information may identify one or more frequency bands to be used to access the application and/or service via base stations 120. The service quality information may also identify a manner in which the application and/or service can be accessed (e.g., as unicast traffic, multicast traffic, broadcast traffic, etc.). The service quality information may also identify service quality thresholds associated with the application and/or service and/or a respective level of service quality for the application and/or service based on a coverage area associated with base stations 120. In another example implementation, user device 110 may obtain the service quality information, from service quality server 145, in response to the instruction to access the application and/or service.

As also shown in FIG. 6, process 600 may include measuring levels of service quality being received from the network (block 615). For example, user device 110 may use a client application, hosted by user device 110, to measure a level of service quality being received, via base station 120, at a first frequency band associated with the application and/or service. The frequency band may be identified by the service quality information. For example, user device 110 may measure a quantity of bandwidth and/or a data rate associated with traffic being transmitted based on the first frequency band. In another example, user device 110 may measure a quantity and/or level of severity of jitter that is detected within the traffic and/or a quantity of dropped and/or mis-ordered packets, associated with the traffic, within a period of time. In yet another example, user device 110 may measure a level of signal strength (e.g., based on a signal power level, a signal-to-noise ratio, a measure of channel isolation, etc.) associated with the traffic.

User device 110 may measure another level of service quality that corresponds to a second frequency band, associated with the application, in a manner similar to that described above. The first frequency band may, for example, allow user device 110 to access the application via a cell associated with base station 120 and the second frequency band may allow user device 110 to access the application via a cell associated with another base station 120. In another example, the first frequency band may allow user device 110 to access the application based on a first delivery mode (e.g., such as multicast) and the second frequency band may allow user device 110 to access the application and/or service based on a second delivery mode (e.g., such as unicast). In yet another example, the second frequency band may be an additional frequency band that allows user device 110 to access the application based on a same delivery mode with which the first frequency band is associated.

As further shown in FIG. 6, process 600 may include assigning one or more quality ratings, to the service, based on service quality thresholds obtained from the service quality information and the measured levels of service quality (block 620). For example, user device 110 may obtain, from the service quality information, service quality thresholds associated with the application and/or service. User device 110 may use the service quality thresholds to assign a quality rating, to application and/or service, based on the measured levels of service quality. For example, user device 110 may determine that a measured level of service quality, associated with the application and/or service, is greater than a high service quality threshold that corresponds to a maximum level of performance with respect to the application. Based on the determination that the measured level of service quality is greater than the high service quality threshold, user device 110 may assign a first quality rating (e.g., a numeric score, a high rating, etc.). In another example, user device 110 may determine that the measured level of service quality is not greater than the high service quality threshold and is greater than a low service quality threshold above which corresponds to a moderate level of performance with respect to the application. Based on the determination that the measured level of service quality is not greater than the high service quality threshold and is greater than the low service quality threshold, user device 110 may assign a second quality rating that is lower than the first quality rating.

In yet another example, user device 110 may determine that the measured level of service quality is not greater than the low service quality threshold, below which corresponds to a minimum level of performance with respect to the application. Based on the determination that the measured level of service quality is not greater than the low service quality threshold, user device 110 may assign a third quality rating that is lower than the second quality rating.

User device 110 may present for display, on user device 110 and via a user interface, service quality information, measured levels of service quality associated with the application and/or service, and/or an expected performance level with respect to the application. As shown in FIG. 7A, user interface 700 may include a collection of data items, such as a group of coverage data items 705-1, . . . , 705-P (where P≥1) (hereinafter referred to collectively as "coverage data items 705" and individually as "coverage data item 705"), a location data item 710, a path data item 715, and a service quality indicator 720. User interface 700 includes data items 705-720 for explanatory purposes. In practice, user interface 700 may include additional data items, fewer data items, different data items, and/or differently arranged data items than are described with respect to flow user interface 700.

Coverage data item 705 may represent coverage areas associated with base station 120 and/or other base stations 120. In one example, coverage data item 705 may represent a cell associated with base station 120 and/or multiple cells associated with base station 120. Coverage data item 705 may include a label that corresponds to an expected level of performance, with respect to the application and/or service, based on other user devices 110 that are accessing the application and/or service via base station 120 and/or other base stations 120. User device 110 may cause coverage data item 705 to change in appearance in relation to the expected level of performance, as identified by label 707. The change in appearance may, for example, correspond to a change in a color, pattern, etc. associated with coverage item 705, a change in a border (e.g., such as a line pattern, thickness, color, etc.) associated with coverage data item 705, a change in a label (e.g., such as a font type, font size, a font color, etc.) associated with coverage data item 705, etc.

Location data item 710 may represent a location, of user device 110, relative to cells associated with base station 120 and/or other base stations 120. Path data item 715 may represent a direction of travel and/or a path that user device 110 has traveled and/or is expected to travel. The path may be based on information associated with prior locations of user device 110, a current location associated with user device 110 and/or one or more future locations at which user device 110 is projected to be at a future period of time. The future locations may be based on a destination identified by a user, of user device 110, and/or alternative routes (e.g., roads, highways, railroads, etc.) available to be taken by the user, etc. that correspond to path data times 715-1 and/or 715-2.

Service quality indicator 720 may represent a measured level of service quality relative to service quality thresholds associated with the application and/or service. Service quality indicator 720 may include a thresholds data item 722, a service quality bar 724, and a performance level data item 726. Thresholds data item 722 represents the service quality thresholds obtained from the service quality information. Service quality bar 724 may present the measured level of service quality. For example, as the measured level of service quality changes, a length and/or appearance of service quality bar 724 may change in relation to the change in the measured level of service quality as described below in FIG. 7B. Performance level data item 726 may identify an expected performance level (e.g., labeled as "moderate"), associated with the application and/or service, based on the measured level of quality as identified by service quality bar 724.

FIG. 7B may include a group of service quality indicators 720-1, . . . , 720-3 as described in FIG. 7A. Service quality indicator 720-1 may correspond to a measured level of service quality that is less than a low service quality threshold. The measured level of service quality, in this example, may correspond to minimum performance level, associated with the application and/or service (e.g., as shown by performance level data item 726-1). Service quality indicator 720-2 may correspond to a measured level of service quality that that corresponds to a medium service quality threshold. The medium service quality threshold may be greater than the low service quality threshold and less than a high service quality threshold. The measured level of service quality, in this example, may correspond to a moderate performance level, associated with the application and/or service (e.g., as shown by performance level data item 726-2). Service quality indicator 720-3 may correspond to a measured level of service quality that is not less than the high service quality threshold. The measured level of service quality, in this example, may correspond to maximum performance level, associated with the application and/or service (e.g., as shown by performance level data item 726-3). The length of service quality bar 724 may increase as the measured level of service quality increases. The appearance of service quality bar 724 may also change depending on the performance level to which the measured level of service quality corresponds. For example, a minimum performance level may cause the appearance, of service quality bar 724 to change (e.g., in pattern, color, etc.) in a manner that corresponds to the minimum performance level (e.g., shown as light gray). In another example, a moderate performance level may cause the appearance, of all or a portion of service quality bar 724 to change (e.g., in pattern, color, etc.) in a manner that corresponds to the moderate performance level (e.g., shown as a cross hashed patter). In yet another example, a maximum performance level may cause the appearance, of all or a portion of service quality bar 724 to change (e.g., in pattern, color, etc.) in a manner that corresponds to the maximum performance level (e.g., shown as dark gray).

Returning to FIG. 6, process 600 may include selecting a manner in which to access the service based on the assigned quality ratings (block 625) and accessing the service based on the selected manner in which to access the service (block 630). For example, user device 110 may compare a first quality rating assigned to a first frequency band associated with the application and/or service with a second quality rating assigned to a second frequency band associated with the application and/or service. User device 110 may select the first frequency band with which to access the application based on a determination that the first quality rating is greater than the second quality rating. In another example, if user device 110 determines that the second quality rating is greater than the first quality rating, user device 110 may select the second frequency band with which to access the application and/or service.

User device 110 may, for example, access the application using the first frequency band based on a determination that the first quality rating is greater than the second quality rating. In one example, user device 110 may access the application and/or service, as unicast traffic, when the first frequency band corresponds to the unicast traffic. In another example, user device 110 may access the application and/or service, as multicast traffic, when the first frequency band corresponds to the unicast traffic. In yet another example, user device 110 may access the application and/or service by initiating a handoff operation, from base station 120 to another base station 120, when the first frequency band corresponds to a cell associated with the other base station 120.

In another example implementation, a user, of user device 110, may instruct user device 110 to access the application and/or service based on an expected level of performance associated the first frequency and/or second frequency. The user may send the instruction by selecting coverage data item 705 (FIG. 7A) and/or label 707 (FIG. 7A) that corresponds to the first frequency band and/or the second frequency band.

Systems and/or methods, described herein, may enable a network to identify service quality thresholds that correspond to levels of service quality associated with an application and/or service to be accessed by a user device. The systems and/or methods may transmit the service quality thresholds to a user device that allows the user device to use the service quality thresholds to identify a level of service quality associated with an application being accessed by the user device. The systems and/or methods may allow the user device to measure a level of service quality being received from the network. The systems and/or methods may enable the user device to render, for display, information associated with the measured level of service quality relative to the service quality thresholds.

The systems and/or methods may allow the user device to use the service quality thresholds and/or the measured levels of service quality and/or signal quality to select a manner in which an application and/or service is to be accessed. The systems and/or methods may, for example, allow the user device to select via which frequency band to access the application and/or service, and/or whether to access the application and/or service as unicast traffic or multicast traffic based on the service quality thresholds and/or the measured levels of service quality and/or signal quality.

The foregoing description provides illustration and description, but is not intended to be exhaustive or to limit the implementations to the precise form disclosed. Modifications and variations are possible in light of the above disclosure or may be acquired from practice of the embodiments.

While series of blocks have been described with regard to FIGS. 5 and 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
receiving, by a device and from a plurality of base stations associated with a radio access network (RAN), traffic information that identifies traffic load conditions associated with the RAN;
identifying, by the device, based on the traffic information, one or more services being provisioned, by the plurality of base stations, to one or more user devices being served by the plurality of base stations;
obtaining, by the device and from a server device, one or more sets of service quality thresholds,
wherein each set of service quality thresholds is associated with a corresponding service, of the one or more services, and each set of service quality thresholds corresponds to one of one or more levels of performance associated with the corresponding service; and
transmitting, by the device and to the one or more user devices, the one or more sets of service quality thresholds,
where the one or more sets of service quality thresholds allow the one or more user devices to select a respective service, of the one or more services, to access.

2. The method of claim 1, where the one of the one or more levels of performance corresponds to a measure of availability associated with the corresponding service, and
where the measure of availability corresponds to a period of time that the corresponding service is expected to be available to be used by a user device relative to another period of time associated with a communication session, associated with the user device, to access the corresponding service.

3. The method of claim 1, where one of the one or more sets of service quality thresholds includes:
a first service quality threshold that corresponds to a first period of time that a user device waits for the corresponding service to become available,
where the first service quality threshold is less than a threshold, and
a second service quality threshold that corresponds to a second period of time that the user device waits for the corresponding service to become available,
where the second service quality threshold is not less than the threshold.

4. The method of claim 1, further comprising:
transmitting, to a first base station, of the plurality of base stations, a request to obtain the traffic information,
where the traffic load information identifies all or a portion of the one or more services that are being provisioned by the first base station and includes at least one of:
information associated with one or more frequency bands that are used, by the first base station, to provision all or the portion of the one or more services,
information that identifies a respective quantity of bandwidth being used, by the first base station, to provision all or the portion of the one or more services, or
information that identifies whether all or the portion of the one or more services are being provisioned, by the first base station, as unicast traffic, multicast traffic, or broadcast traffic.

5. The method of claim 1, further comprising:
obtaining, from the one or more user devices, information that identifies levels of service quality being received, by the one or more user devices, when accessing the one or more services,
where a level of service quality, of the levels of service quality, being received by a first user device, of the one or more user devices, corresponds to at least one of:
a quantity of bandwidth being used, by the first user device, when accessing a service of the one or more services,
a data rate, associated with traffic, being received, by the first user device, while accessing the service, or
a quantity of dropped or mis-ordered packets, within a period of time, associated with the traffic being received, by the first user device, while accessing the service.

6. The method of claim 5, further comprising:
transmitting, to a second user device of the one or more user devices, the information that identifies the levels of service quality being received by the one or more user devices, where transmitting the information, that identifies the levels of service quality being received by the one or more user devices:
allows the second user device to identify another level of service quality, of the levels of service quality, being received by a portion of the one or more user devices that are accessing another service of the one or more services, and
allows the second user device to determine whether to access the other service based on the identified other level of service quality.

7. A user device comprising:
a memory to store service quality information associated with one or more applications being provisioned via a plurality of base stations,
where the service quality information identifies one or more sets of quality thresholds, and each set of quality thresholds, of the one or more sets of quality thresholds, is associated with one of the one or more applications; and
a processor to:
receive an instruction to access a first application, of the one or more applications,
measure, as a result of the instruction, a first level of service quality, associated with traffic being received via a first frequency band associated with the first application and a second level of service quality, associated with traffic being received via a second frequency band associated with the first application,
identify a first threshold, associated with a first set of quality thresholds, of the one or more sets of quality thresholds, relating to the first frequency band, to which the first level of service quality corresponds,
identify a second threshold, associated with a second set of quality thresholds, of the one or more sets of quality thresholds, relating to the second frequency band, to which the second level of service quality corresponds, and access the first application using one of the first frequency band or the second frequency band based on whether the first threshold is greater than the second threshold.

8. The user device of claim 7, where the processor is further to:
obtain, from a server device, the service quality information, and
store the service quality information in the memory.

9. The user device of claim 7, where, when measuring the first level of service quality and the second level of service quality, the processor is further to:
measure a first quantity of bandwidth associated with the traffic being received via the first frequency band, and
measure a second quantity of bandwidth associated with the traffic being received via the second frequency band.

10. The user device of claim 9, where, when identifying the first threshold to which the first level of service quality corresponds, the processor is further to:
determine that the first quantity of bandwidth is greater than the first threshold and less than a third threshold associated with the first set of quality thresholds relating to the first frequency band.

11. The user device of claim 7, where the processor is further to:
determine that the first threshold is greater than the second threshold, and
access the first application via the first frequency band based on a determination that the first threshold is greater than the second threshold.

12. The user device of claim 7, where the processor is further to:
determine that the first frequency band corresponds to multicast traffic and the second frequency band corresponds to unicast traffic,
access the first application, as the multicast traffic, based on a determination that the first threshold is greater than the second threshold, and
access the first application, as the unicast traffic, based on a determination that the first threshold is not greater than the second threshold.

13. The user device of claim 7, where the processor is further to:
determine that the first frequency band allows the first application to be accessed via a first base station of the plurality of base stations and the second frequency band allows the first application to be accessed via a second base station of the plurality of base stations,
access the first application, using the first frequency band and via the first base station, based on a determination that the first threshold is greater than the second threshold, and
perform a handoff, to the second base station, to access the first application, using the second frequency band and via the second base station, based on a determination that the first threshold is not greater than the second threshold.

14. The user device of claim 7, where the processor is further to:
present, for display and via a user interface, the service quality information associated with the first application, where the user interface includes a service quality indicator that identifies the first level of service quality relative to the first set of quality thresholds and the second level of service quality relative to the second set of quality thresholds.

15. The user device of claim 14, where the processor is further to:
receive, from a user and via the user interface, selection of the first level of service quality, and
access the first application, using the first frequency band, based on the selection of the first level of service quality.

16. A user device, comprising:
one or more processors to:
receive an instruction to access a first application, of one or more applications being provisioned, via one or more base stations,
obtain, from a server device and as a result of the instruction, service quality information, associated with the first application,
the service quality information identifying one or more quality thresholds,
wherein each quality threshold, of the one or more quality thresholds, is associated with one of one or more frequency bands to be used to access the first application,
measure a first level of service quality associated with traffic being received via a first frequency band of the one or more frequency bands and a second level of service quality associated with traffic being received via a second frequency band of the one or more frequency bands, and
access the first application using one of the first frequency band or the second frequency band based on a determination that one of the first level of service quality or the second level of service quality is less than a quality threshold, of the one or more quality thresholds.

17. The user device of claim 16, where the one or more quality thresholds include at least one of:
a first quality threshold that corresponds to the first application being available, to be used by the user device, for a period of time that is greater than a first threshold,
a second quality threshold that corresponds to the first application being available, to be used by the user device, for another period of time that is not greater than first threshold and is greater than a second threshold, or
a third quality threshold that corresponds to the first application being available, to be used by the user device, for a further period of time that is not greater than the second threshold.

18. The user device of claim 16, where the one or more processors are further to:
determine that a level of service quality, associated with a second application, of the one or more applications, is less than another quality threshold, of one or more quality thresholds associated with the second application, and
access a third application, of the one or more applications, based on the determination that the level of service quality is less than the other quality threshold.

19. The user device of claim 16, where the first frequency band is used, by a first base station of the one or more base stations, to provision the first application as multicast traffic;
where the second frequency band is used, by the first base station, to provision the first application as unicast traffic; and
where the one or more processors are further to:
transmit, to the first base station, a first request to be handed off, from a second base station of the one or more base stations,
where the first request includes a first indication that the first application is to be accessed as multicast traffic based on a determination that the second level of service quality is less than the quality threshold, and transmit, to the first base station, a second request to be handed off, from the second base station,
where the second request includes a second indication that the first application is to be accessed as the unicast traffic based on a determination that the first level of service quality is less than the quality threshold.

20. The user device of claim 16, where the one or more processors are further to:
determine, based on the service quality information, that a first level of service quality being received by other user devices that are accessing a second application, as multicast traffic, is less than a first minimum quality threshold, of the one or more quality thresholds, associated with the multicast traffic,
determine, based on the service quality information, that a second level of service quality being received by further user devices that are accessing the second application, as unicast traffic, is not less than a second minimum quality threshold, of the one or more quality thresholds, associated with the unicast traffic, and
access the second application, as the unicast traffic, based on a determination that the second level of service quality, being received by the further user devices, is not less than the second minimum quality threshold associated with the unicast traffic.

21. The user device of claim 16, where the service quality information includes the information identifying the one or more quality thresholds and at least one of:
information associated with the one or more frequency bands with which the one or more quality thresholds are associated,
information that identifies which of the one or more frequency bands allows the first application to be accessed as unicast traffic, multicast traffic, or broadcast traffic, or
information that identifies a manner in which the first application may be accessed, via the one or more base stations, using the one or more frequency bands.

22. The user device of claim 16, where the one or more processors are further to:
obtain, from the service quality information, information associated with a level of service quality being received by one or more other user devices while accessing the first application within a geographical area,
determine that the user device is entering a cell, associated with a base station, that is located within the geographical area,
access the first application, via the base station, based on a determination that the level of service quality, being received by the one or more other user devices, is greater than another threshold, of the one or more quality thresholds, and
access a second application, via the base station, based on a determination that the level of service quality, being received by the one or more other user devices, is not greater than the other threshold.

23. The user device of claim 22, where the one or more processors are further to:
present, for display and via a user interface, information associated with the level of service quality being received by the one or more other user devices while accessing the first application within the geographical area, where the user interface includes at least one of:
a service quality indicator that identifies the first level of service quality or the second level of service quality relative to the one or more quality thresholds,
a data item that represents a coverage area of one or more cells, associated with the base station that is located within the geographical area, or
the information associated with the level of service quality being received by the one or more other user devices.

24. The user device of claim 16, where, when obtaining the service quality information, the one or more processors are further to:
transmit, to a server device, a request for the service quality information associated with the first application, and
receive, from the server device and as a result of the request, the service quality information based on a customer-premises equipment (CPE) wide area network (WAN) management protocol (CWMP).

25. The user device of claim 24, where the one or more processors are further to:
store the service quality information in a memory associated with the user device, where storing the service quality information causes previous service quality information, that was stored in the memory when the user device was being fabricated or when the user device was being registered with a network, to be erased or over-written.

* * * * *